(12) United States Patent
Hata

(10) Patent No.: US 8,072,583 B2
(45) Date of Patent: Dec. 6, 2011

(54) RANGE-FINDING DEVICE

(75) Inventor: Yukitsugu Hata, Hadano (JP)

(73) Assignee: Nikon Vision Co., Ltd., Tokyo (JP)

( * ) Notice: Subject to any disclaimer, the term of this patent is extended or adjusted under 35 U.S.C. 154(b) by 0 days.

(21) Appl. No.: 12/847,507

(22) Filed: Jul. 30, 2010

(65) Prior Publication Data

US 2010/0290029 A1 Nov. 18, 2010

Related U.S. Application Data

(63) Continuation of application No. PCT/JP2008/064145, filed on Aug. 6, 2008.

(51) Int. Cl.
G01C 3/08 (2006.01)
(52) U.S. Cl. ....................... 356/5.01; 356/4.01
(58) Field of Classification Search ............. 356/5.01, 356/4.01, 501
See application file for complete search history.

(56) References Cited

U.S. PATENT DOCUMENTS

| | | | |
|---|---|---|---|
| 2004/0070748 A1 | 4/2004 | Inaba et al. | |
| 2005/0231709 A1 | 10/2005 | Inaba et al. | |
| 2009/0141261 A1* | 6/2009 | Lukas et al. | 356/4.01 |
| 2011/0022357 A1* | 1/2011 | Vock et al. | 702/182 |

FOREIGN PATENT DOCUMENTS

| | | |
|---|---|---|
| JP | A 63-131085 | 6/1988 |
| JP | A 6-242244 | 9/1994 |
| JP | U 7-018763 | 4/1995 |
| JP | A 7-128449 | 5/1995 |
| JP | A 9-080151 | 3/1997 |
| JP | A 2000-131460 | 5/2000 |
| JP | A 2005-189140 | 7/2005 |
| WO | WO 02/088772 A1 | 11/2002 |
| WO | WO2007110269 A1 * | 10/2007 |

OTHER PUBLICATIONS

International Search Report issued in corresponding International Application No. PCT/JP2008/064145, mailed Sep. 2, 2008.

* cited by examiner

*Primary Examiner* — Isam Alsomiri
(74) *Attorney, Agent, or Firm* — Oliff & Berridge, PLC

(57) ABSTRACT

A range-finding device includes: a light emitting unit that continuously emits measurement light to be used for distance measurement toward a measurement target object; a light-receiving unit that receives reflected light reflected by the measurement target object; a calculation unit that repeatedly calculates a distance to the measurement target object over predetermined time intervals by using the reflected light; a display unit at which an update of the distance is displayed each time the distance is calculated by the calculation unit; and a display update control unit that prohibits the update of the distance on display at the display unit and sustains the display of the previously calculated distance at the display unit according to a change in the most recently calculated distance calculated most recently by the calculation unit relative to the previously calculated distance having been calculated previously by the calculation unit.

8 Claims, 9 Drawing Sheets

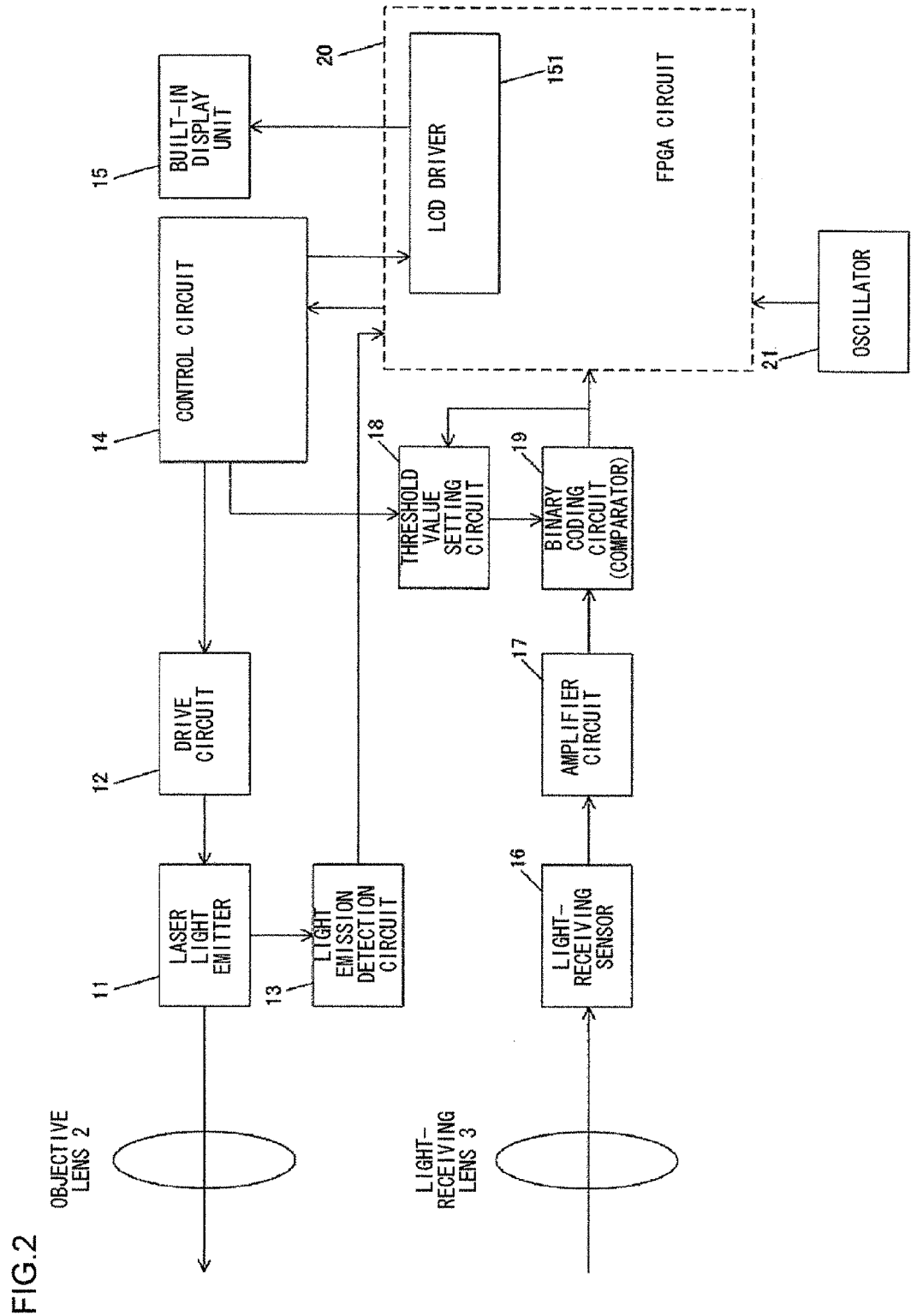

FIG.5

| | MEASURED DISTANCE DATA (yd) | DISPLAYED DISTANCE (yd) |
|---|---|---|
| FIRST MEASUREMENT | d1=190 | D1=190 |
| SECOND MEASUREMENT | d2=180 | D2=180 |
| THIRD MEASUREMENT | d3=179 | D3=179 |
| FOURTH MEASUREMENT | d4=187 | D3=179 |
| FIFTH MEASUREMENT | d5=185 | D3=179 |
| SIXTH MEASUREMENT | d6=186 | D3=179 |
| SEVENTH MEASUREMENT | d7=187 | D3=179 |
| EIGHTH MEASUREMENT | d8=190 | D8=190 |
| ⋮ | ⋮ | ⋮ |

FIG.6A FIRST MEASUREMENT
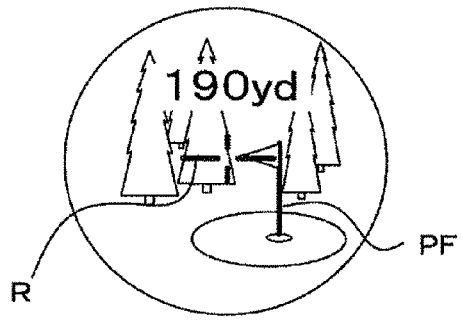
FIG.6B SECOND MEASUREMENT
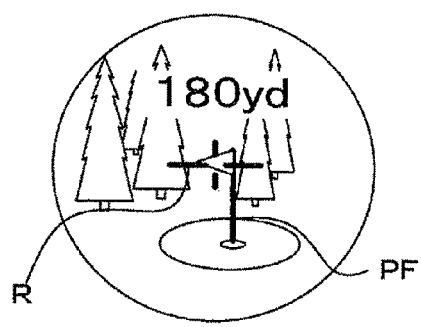
FIG.6C THIRD MEASUREMENT
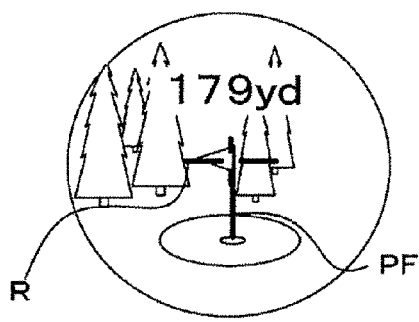
FIG.6D FOURTH MEASUREMENT
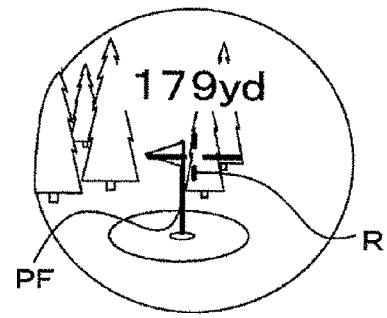
FIG.6E FIFTH MEASUREMENT
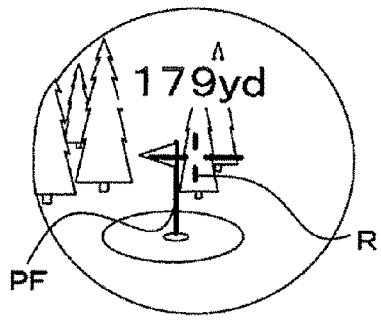
FIG.6F SIXTH MEASUREMENT
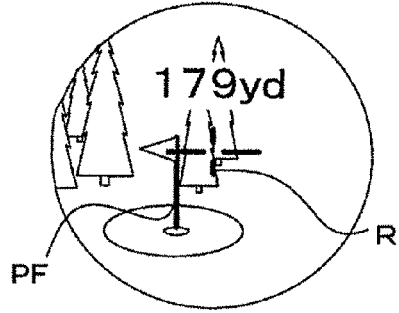
FIG.6G SEVENTH MEASUREMENT
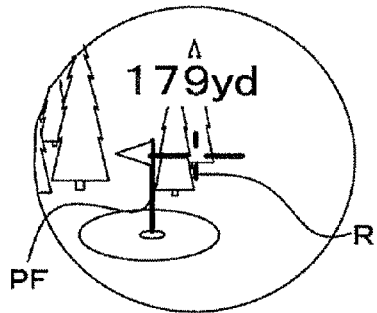
FIG.6H EIGHTH MEASUREMENT
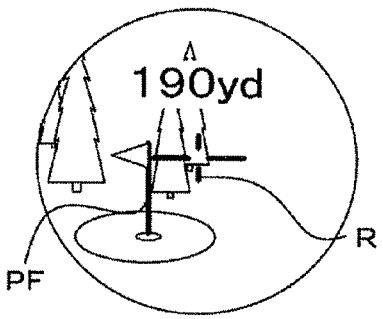

RANGE-FINDING DEVICE

This application is a continuation of International Application No. PCT/JP 2008/064145 filed Aug. 6, 2008

INCORPORATION BY REFERENCE

The disclosure of the following application is herein incorporated by reference: International Application No. PCT/JP 2008/064145 filed Aug. 6, 2008

BACKGROUND OF THE INVENTION

1. Field of the Invention

The present invention relates to a range-finding device that measures the distance to a measurement target object.

2. Description of Related Art

International Publication No. 02/0887722 discloses a laser range-finding device that measures the distance to a measurement target object by radiating pulse laser light or the like toward the measurement target object and brings up the measurement results on display at a distance display unit.

SUMMARY OF THE INVENTION

However, when the measurement of the distance to the measurement target object is done continuously by the range-finding device, it is difficult that user recognizes the measurement distance to the measurement target object because the measurement result display is continuously changed if the measurement target objects have a specific shape or size.

According to the 1st aspect of the present invention, a range-finding device comprises: a light emitting unit that continuously emits measurement light to be used for distance measurement toward a measurement target object; a light-receiving unit that receives reflected light reflected by the measurement target object; a calculation unit that repeatedly calculates a distance to the measurement target object over predetermined time intervals by using the reflected light; a display unit at which an update of the distance is displayed each time the distance is calculated by the calculation unit; and a display update control unit that prohibits the update of the distance on display at the display unit and sustains the display of the previously calculated distance at the display unit according to a change in the most recently calculated distance calculated most recently by the calculation unit relative to the previously calculated distance having been calculated previously by the calculation unit.

According to the 2nd aspect of the present invention, it is preferred that in the range-finding device according to the 1st aspect, when prohibiting the update of the distance on display at the display unit, the display update control unit sustains the display of the previously calculated distance at the display unit for a duration of a predetermined holding time.

According to the 3rd aspect of the present invention, it is preferred that in the range-finding device according to the 2nd aspect, once the holding time elapses, a distance newly calculated by the calculation unit is displayed at the display unit.

According to the 4th aspect of the present invention, it is preferred that the range-finding device according to the 1st aspect further comprises: a difference calculation unit that calculates a difference between the distance most recently calculated by the calculation unit and the previously calculated distance having been calculated previously by the calculation unit, and in the range-finding device the display update control unit prohibits the update of the distance on display at the display unit based upon the difference as the change.

According to the 5th aspect of the present invention, it is preferred that the range-finding device according to the 4th aspect further comprises: a decision-making unit that makes a decision as to whether or not the difference calculated by the difference calculation unit exceeds a threshold value, and in the range-finding device when the decision-making unit determines that the difference exceeds the threshold value, the display update control unit prohibits the update of the distance on display at the display unit and sustains the previously calculated distance on display at the display unit.

According to the 6th aspect of the present invention, it is preferred that in the range-finding device according to the 5th aspect, the difference calculation unit calculates the difference by subtracting the previously calculated distance from the most recently calculated distance and also calculates the difference by subtracting the most recently calculated distance from the previously calculated distance.

According to the 7th aspect of the present invention, it is preferred that in the range-finding device according to the 6th aspect, the difference calculation unit includes a first difference calculation unit that calculates the difference by subtracting the previously calculated distance from the most recently calculated distance and a second difference calculation unit that calculates the difference by subtracting the most recently calculated distance from the previously calculated distance; the decision-making unit includes a first decision-making unit that makes a decision as to whether or not the difference calculated by the first difference calculation unit exceeds a first threshold value and a second decision-making unit that makes a decision as to whether or not the difference calculated by the second difference calculation unit exceeds a second threshold value; and the range-finding device further comprises a first operation member operated to select between a first mode and a second mode, in the first mode the display update control unit displaying the previously calculated distance at the display unit when the difference calculated by the first difference calculation unit exceeding the first threshold value, and in the second mode the display update control unit displaying the previously calculated distance at the display unit when the difference calculated by the second difference calculation unit exceeding the second threshold value.

According to the 8th aspect of the present invention, it is preferred that the range-finding device according to the 7th aspect further comprises: a second operation member operated to adjust a setting for the first threshold value, the second threshold value or the holding time.

According to the 9th aspect of the present invention, it is preferred that the range-finding device according to the 1st aspect further comprises: a viewing optical system through which the measurement target object is viewed, and in the range-finding device a display is brought up at the display unit so that at least an index indicating a measurement position and the distance having been calculated are viewed within a visual field containing the measurement target object.

BRIEF DESCRIPTION OF THE DRAWINGS

FIG. 2 is a block diagram showing the internal structure of the range-finding device achieved in the embodiment FIGS. 3A~3C each present an example of a measured distance frequency distribution

FIG. 5 shows the relationship between the measurement results obtained through distance measurement and the display update FIGS. 6A~6H each present an example of a display that may be brought up to provide distance measurement results, with FIG. 6A presenting an example of a display providing the first measurement results, FIG. 6B presenting an example of a display providing the second measurement results, FIG. 6C presenting an example of a display providing the third measurement results, FIG. 6D presenting an example of a display providing the fourth measurement results, FIG. 6E presenting an example of a display providing the fifth measurement results, FIG. 6F presenting an example of a display providing the sixth measurement results, FIG. 6G presenting an example of a display providing the seventh measurement results and FIG. 6H presenting an example of a display providing the eighth measurement results

DESCRIPTION OF PREFERRED EMBODIMENT

The following is a description of the range-finding device achieved in an embodiment of the present invention. The range-finding device in the embodiment measures the distance to a measurement target object by measuring the length of time to elapse (time lag) between a time point at which measurement light is emitted and a time point at which light reflected off the measurement target object is returned.

Figure 1:
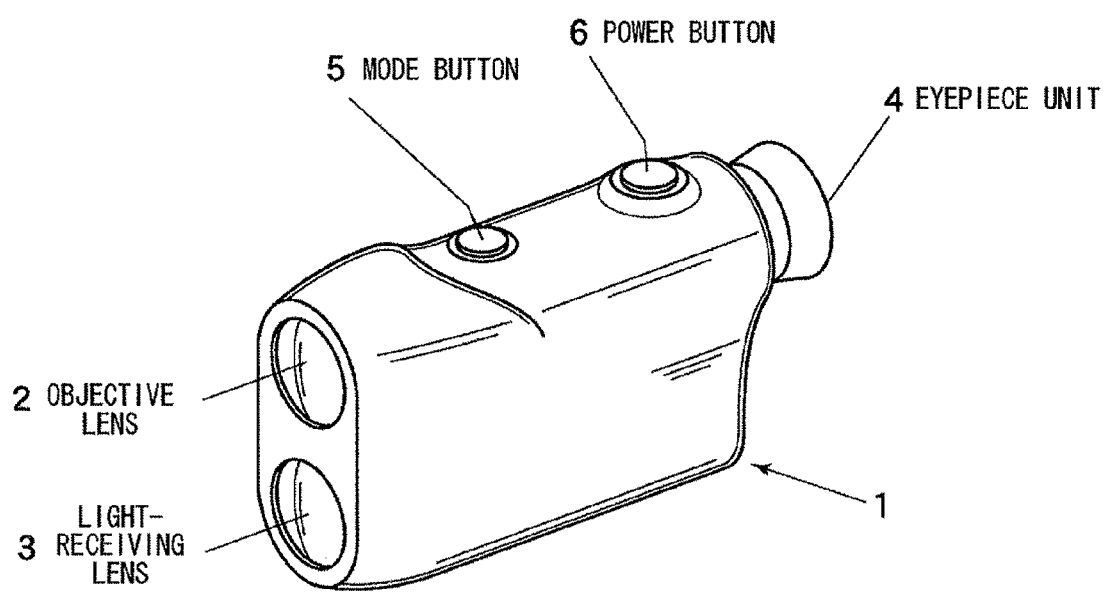
FIG. 1 provides an external view of the range-finding device achieved in an embodiment of the present invention

As the external view provided in FIG. 1 shows, the range-finding device 1 includes an objective lens 2, a light-receiving lens 3, an eyepiece unit 4, a mode button 5 and a power button 6. The objective lens 2 and the light-receiving lens 3 are disposed at the front surface of the range-finding device 1. Light having traveled from the measurement target object and entered the objective lens 2 is guided via the objective lens 2 to the eyepiece unit 4 disposed on the rear side of the range-finding device 1. While measuring the distance to the measurement target object, the user is able to observe the measurement target object via the eyepiece unit 4. In addition, pulse laser light having originated at a laser light emitter to be detailed later, is used as measurement light in the distance measurement after it departs the objective lens 2. The measurement light reflected at the measurement target object (reflected light) is then received via the light-receiving lens 3 at a light-receiving sensor to be described later.

The mode button 5 and the power button 6 are disposed at the top of the casing of the range-finding device, at positions at which the user holding the range-finding device 1 in one hand is able to operate the buttons with ease. The mode button 5 is an operation member operated by the user in order to switch between a short distance priority mode and a long distance priority mode as detailed later, to select either a continuous measurement or a one-time measurement, or to select/reset various other settings. The power button 6 is an operation member operated by the user to turn on/off power, start range-finding operation, confirm a setting having been selected via the mode button 5 or the like.

As shown in the internal structure block diagram presented in FIG. 2, the range-finding device 1 includes a laser light emitter 11, a drive circuit 12, a light emission detection circuit 13, a control circuit 14, a built-in display unit 15, a light-receiving sensor 16, an amplifier circuit 17, a threshold value setting circuit 18, a binary coding circuit 19, an FPGA (field programmable gate array) circuit 20 and an oscillator 21. The laser light emitter 11 is a light emitting element such as a laser diode that emits semiconductor laser light. The drive circuit 12 is a pulse generation circuit that outputs a drive pulse to the laser light emitter 11 a predetermined number of times (e.g., 550 times) over a predetermined measurement cycle, which goes on for a predetermined length of time (e.g., 12.5 ns) based upon a signal provided from the control circuit 14. As a result, the laser light to be used as the measurement light is emitted 550 times for each measurement session. The light emission detection circuit 13 outputs to the FPGA circuit 20 a signal indicating the timing with which the laser light has been emitted each time the laser light emitter 11 emits laser light.

The control circuit 14, which is an arithmetic operation circuit equipped with a CPU, a ROM, a RAM and the like (not shown), controls the various structural elements constituting the range-finding device 1 and executes various types of data processing. In addition, based upon the measurement light frequency distribution (histogram) input thereto from the FPGA circuit 20 to be detailed later, the control circuit 14 calculates measurement results (indicating the measured distance) for each range-finding session. The control circuit 14 drives the built-in display unit 15 via an LCD driver 151 installed in the FPGA circuit 20 so as to bring up on display the measurement results indicating the measured distance. At the built-in display unit 15, constituted with a liquid crystal display unit or the like and disposed between the objective lens 2 and the eyepiece unit 4, the measured distance or a reticle is displayed. Thus, the measured distance or the reticle displayed at the built-in display unit 15, is positioned within the same visual field as that in which the image of the measurement target object, observed via the eyepiece unit 4, is present and the user is able to view the measured distance or the reticle together with the target object image in the same field. It is to be noted that a liquid crystal display unit or the like may be disposed at the exterior of the body of the laser range-finding device 1 in place of the built-in display unit 15.

The light-receiving sensor 16, which is a photoelectric conversion element such as a photodiode, receives the reflected light having traveled back from the measurement target object, converts the reflected light to an electrical signal corresponding to the intensity of the received reflected light and outputs the electrical signal to the amplifier circuit 17. The amplifier circuit 17 executes amplification processing and the like on the signal input thereto and outputs the signal having undergone the amplification processing and the like to the binary coding circuit 19.

The binary coding circuit 19 is a comparator that compares the signal indicating the intensity of the reflected light, having been input thereto from the amplifier circuit 17, with an intensity decision-making threshold value input from the threshold value setting circuit 18. Consequently, a signal indicating reflected light with an intensity level exceeding the intensity decision-making threshold value, i.e., a signal indicating reflected light exceeding the noise component, is output to the FPGA circuit 20.

The FPGA circuit 20 is a gate array capable into which a logic circuit may be written. The FPGA circuit 20 samples the reflected light at each cycle of a timing signal output from the oscillator 21. Then, based upon the signals input thereto from the light emission detection circuit 13 and the binary coding circuit 19, the FPGA circuit 20 calculates the distance to the measurement target object. Namely, the length of time having elapsed until the measurement light emitted from the laser light emitter 11 and reflected at the measurement target object is received at the light-receiving sensor 16, is converted to a value indicating the distance based upon the speed with which the laser light is propagated through the space.

Figure 3A:
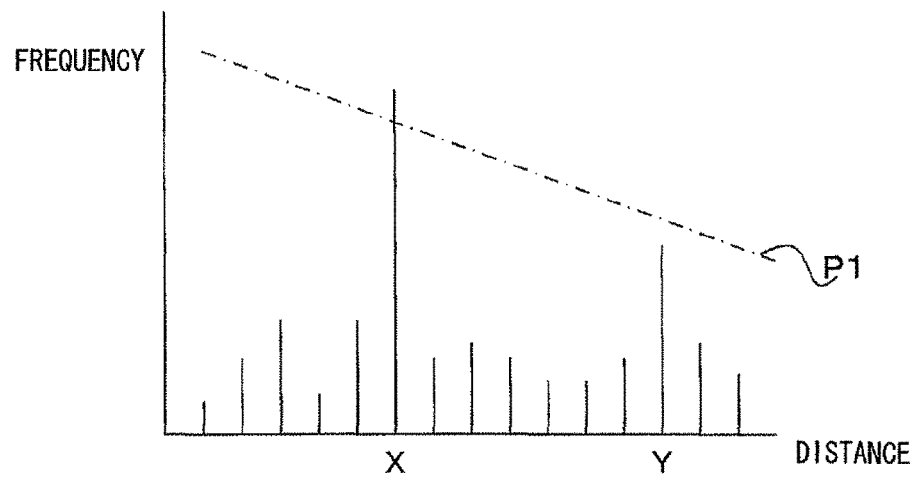
Figure 3B:
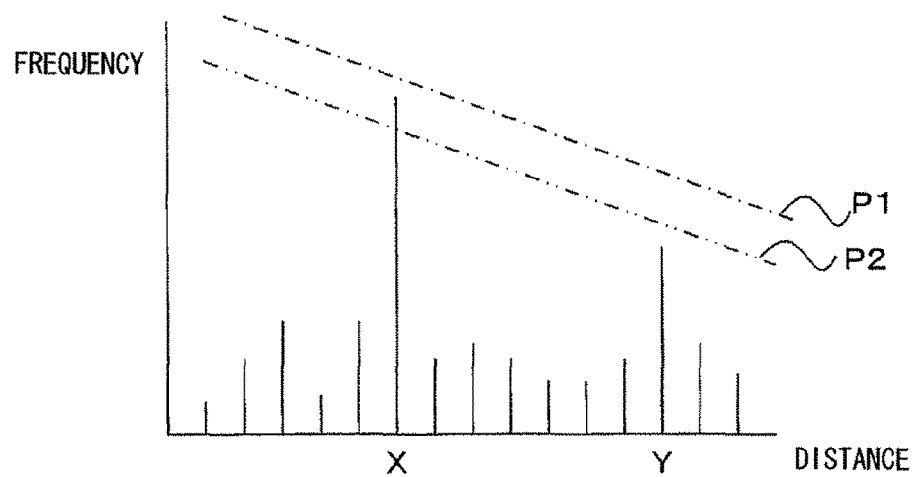
Figure 3C:
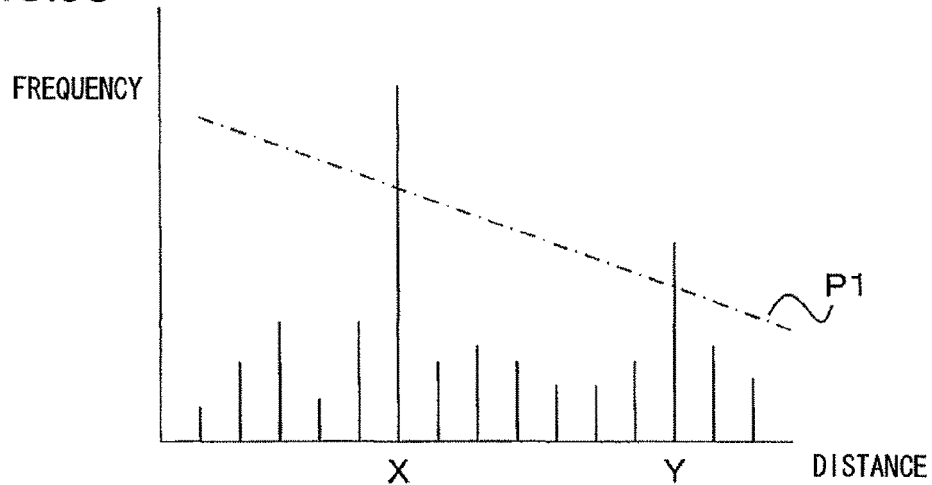

Based upon the measured distances calculated as described above in correspondence to the 550 shots of laser light, the FPGA circuit 20 creates a frequency distribution (histogram) through a method of the known art. FIGS. 3A~3C each present an example of a histogram that may be created by the FPGA circuit. The FPGA circuit 20 then stores the histogram into a specific memory within the FPGA circuit 20 and also outputs the histogram to the control circuit 14. The control circuit 14 calculates the measured distance by using the histogram input thereto. The following is an explanation of measured distance calculation, given in reference to the histograms presented in FIGS. 3A~3C.

The histogram in FIG. 3A indicates greater frequencies in correspondence to distances X and Y. Under these circumstances, the control circuit 14 determines a distance corresponding to the frequency exceeding a decision-making threshold value P1 indicated by the one-point chain line in FIG. 3A to be the measured distance. The decision-making threshold value P1 is set so that it changes in correspondence to the distance, i.e., so that its value becomes smaller as the distance to the measurement target object increases. In the example presented in FIG. 3A, the distance X is determined to be the measured distance. It is to be noted that if there is no frequency exceeding the decision-making threshold value P1, the control circuit 14 determines the measured distance by using a decision-making threshold value P2 which also changes in correspondence to the distance, as indicated by the two-point chain line in FIG. 3B. A value that is invariably smaller than the decision-making threshold value P1 is assumed for the decision-making threshold value P2.

FIG. 3C shows a plurality of distances corresponding to frequencies exceeding the decision-making threshold value P1, i.e., the frequencies corresponding to the distance X and the distance Y both exceed the decision-making threshold value P1. In this situation, the control circuit 14 makes a decision as to whether the user has selected the short distance priority mode or the long distance priority mode. Then, if the short distance priority mode is currently set, the control circuit 14 determines the distance X to be the measured distance, whereas if the long distance priority mode is currently set, the control circuit 14 determines the distance Y to be the measured distance.

The display control executed to display the measurement results (measured distance) in conjunction with the one-time measurement setting and the display control executed to display the measurement results in conjunction with the continuous measurement setting are now individually described. It is to be noted that while an explanation is given on an example in which the continuous measurement setting is selected by operating the mode button 5, the continuous measurement operation may instead start as the power button 6 is held down for a predetermined length of time or more (prolonged depression). In addition, the following explanation is given by assuming that the short distance priority mode is currently set.

One-Time Measurement

In a one-time measurement operation, the control circuit 14 calculates the measured distance by executing distance measurement once, as described above, in response to a measurement start instruction signal input thereto from a power switch 6a corresponding to the power button 6 as the power button 6 is operated. The control circuit 14 then brings up the measured distance on display at the built-in display unit 15 by controlling the LCD driver 151.

Continuous Measurement

In a continuous measurement operation, the control circuit 14 executes distance measurement successively over predetermined time intervals, e.g., 0.2-sec intervals over a duration of for instance, 8 seconds in response to the measurement start instruction signal input thereto from the power switch 6a. Each time the distance measurement results become available, the control circuit 14 updates the measurement result display at the built-in display unit 15 by controlling the LCD driver 151. In other words, the measured distance display at the built-in display unit 15 will normally be updated every 0.2 sec.

If the change in the current measurement results relative to the previous measurement results, i.e., the difference between the current measurement results and the previous measurement results, satisfies a specific condition (1) below, the control circuit 14 prohibits the update of the measurement result display and instead keeps the same measurement results on display during a specific length of holding time, e.g., 0.8 seconds. In other words, the control circuit 14 does not display four consecutive sets of measurement results at the built-in display unit 15. It is to be noted that the length of the holding time can be adjusted by the user by operating the mode button 5.

$$B-A \geq a \qquad (1)$$

A, B and a in the expression presented above respectively represent the previous measured distance, the current measured distance and a reference distance.

Once the 0.8-sec holding time elapses, the control circuit 14 displays the measured distance indicated by the newly acquired measurement results at the built-in display unit 15. The control executed by the control circuit 14 is now explained in further detail in reference to FIGS. 4~6H.

Figure 4:
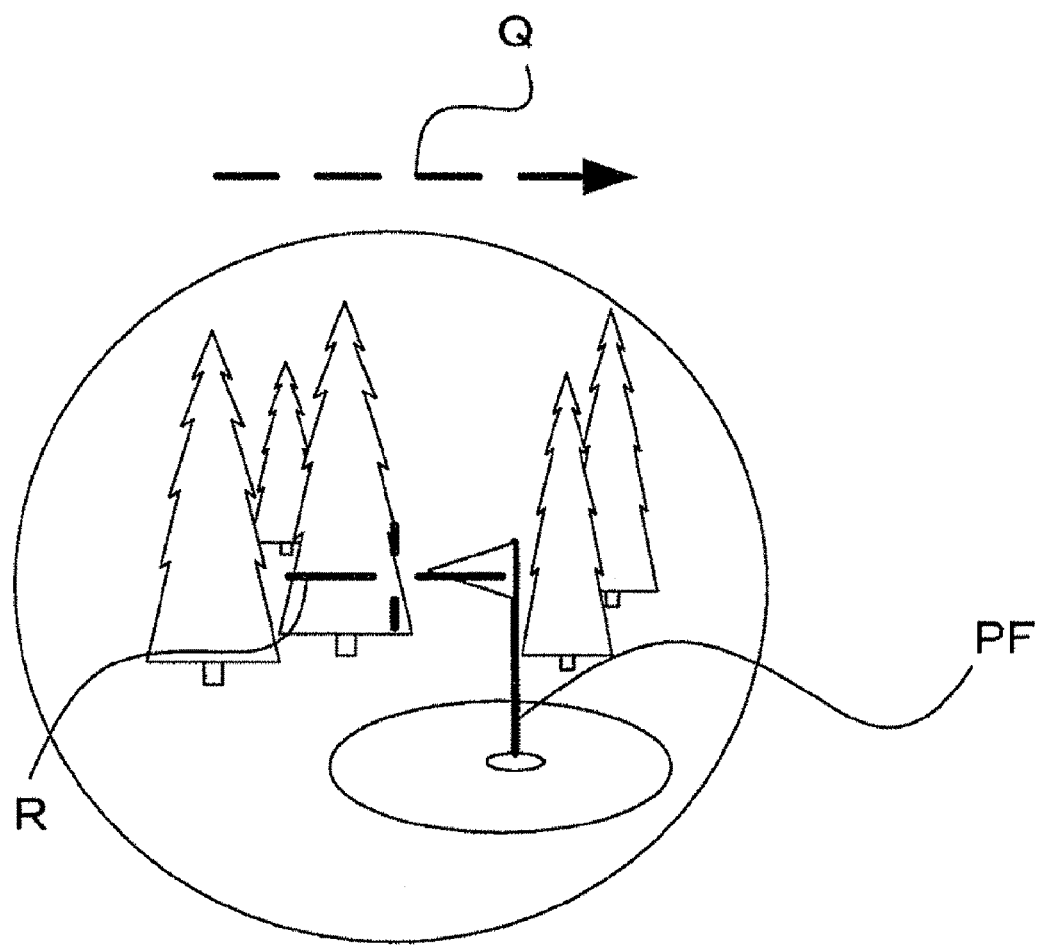
FIG. 4 presents an example of a measurement target object that can be visually checked by the user via the eyepiece unit 4

FIG. 4 presents an example of a measurement target object visually checked by the user via the eyepiece unit 4 during the distance measurement. FIG. 4 shows a pin flag PF on a golf course, the distance to which is being measured, with trees present beyond the flag PF further away from the user. In addition, a reticle index R in FIG. 4 indicates the position at which the distance measurement is executed. When the measurement target is a thin object such as the pin flag PF, the reticle index R cannot easily be aligned with the measurement target object. Accordingly, the user often performs continuous measurement (scan) by moving the range-finding device 1 in tiny increments from a point near the pin flag PF (a point on the left side or the right side of the pin flag PF) to fix on the pin flag PF. Thus, the following description is provided by assuming that the continuous measurement is executed as the reticle index R shifts along the direction indicated by the dotted-line arrow Q in FIG. 4. In addition, the following description is given by assuming that the reference distance a in conditional expression (1) is set to 5 yd. The reference distance a can be adjusted by the user by operating the mode button 5.

FIG. 5 shows the relationship between the measurement results obtained through the continuous measurement in the short distance priority mode and the display update. As described earlier, the control circuit 14 calculates a first measured distance D1 based upon the histogram input thereto from the FPGA circuit 20. The control circuit 14 then controls the LCD driver 151 so as to display the calculated measured distance D1 (190 yd) at the built-in display unit 15. The user is thus able to view the measured distance (190 yd) in the same visual field where the image of the measurement target object, i.e., the pin flag PF, is present, as shown in the example for the first display presented in FIG. 6A. The control circuit 14 also stores measured distance data d1 corresponding to the first measured distance D1 having been input into a specific memory (not shown) within the control circuit 14.

When the predetermined length of time, i.e., 0.2 sec, elapses following the end of the first measurement, the control circuit 14 takes in the histogram created by the FPGA circuit 20 by executing the second measurement. The control circuit 14 then calculates a second measured distance D2 (180 yd). The control circuit 14 calculates the difference between the measured distance data d2 corresponding to the measured distance D2 and the first measured distance data d1 stored in the memory and makes a decision as to whether or not the difference indicated by the calculation results satisfies the condition (1). The difference obtained by subtracting the first measured distance (190 yd) from the second measured distance (180 yd) is (−10 yd) and therefore, the condition (1) is not satisfied. In this situation, the control circuit 14 controls the LCD driver 151 so as to bring up the measured distance D2 (180 yd) corresponding to the measured distance data d2 up on display at the built-in display unit 15. Namely, the display at the built-in display unit 15 is switched and the user is able to view the measured distance (180 yd) in the same visual field where the image of the pin flag PF is present, as shown in the example of the second display presented in FIG. 6B. In addition, the control circuit 14 stores the measured distance data d2 by overwriting the memory.

Next, the control circuit 14 calculates a third measured distance D3 (179 yd) through a similar process. The difference obtained by subtracting the second measured distance D2 (180 yd) from the third measured distance D3 (179 yd) is (−1 yd) and therefore, the condition (1) is not satisfied. Accordingly, the control circuit 14 switches the display at the built-in display unit 15 and brings up the measured distance D3 (179 yd) corresponding to the measured distance data d3 on display. An example of display that may be brought up in this situation is presented in FIG. 6C.

After finishing the third measurement, the control circuit 14 calculates a fourth measured distance D4 (187 yd) through a similar process, calculates the difference between measured distance data d4 corresponding to the measured distance D4 and the third measured distance data d3 stored in the memory, and makes a decision as to whether or not the difference indicated by the calculation results satisfies the condition (1). The difference calculated by subtracting the third measured distance (179 yd) from the fourth measured distance (187 yd) is 8 yd and, therefore, the condition (1) is satisfied. Under these circumstances, the control circuit 14 keeps the measured distance D3 (179 yd) corresponding to the measured distance data d3 on display at the built-in display unit 15. Namely, the control circuit 14 prohibits any alteration in the display at the built-in display unit 15. As a result, the measured distance (179 yd) continues to be viewed by the user in the same visual field where the image of the pin flag PF is present, as shown in the example for the fourth display presented in FIG. 6D. At this time, the control circuit 14 starts up a hold counter. The hold encounter is engaged in operation to count the number of times the distance measurement is executed while the display alteration is prohibited.

Subsequently, the control circuit 14 sustains the prohibition against any alteration of the measured distance display at the built-in display unit 15 even as measured distances are calculated in correspondence to the fifth through seventh measurements. As a result, while the distance is measured four times through the fourth through seventh measurements, i.e., until the holding time (0.8 sec) elapses, the measured distance D3 (179 yd) corresponding to the measured distance data d3 remains on display at the built-in display unit 15. Thus, the same measured distance (179 yd), still in the same visual field where the image of the pin flag PF is present, continues to be viewed by the user, as shown in the examples of the fourth through seventh displays presented in FIGS. 6D through 6G. Each time a histogram is input from the FPGA circuit 20 and a measured distance is calculated while the prohibition against alteration of the measured distance display at the built-in display unit 15 is in effect, the control circuit 14 increments the hold counter.

Once the count at the hold counter reaches 4 and the control circuit 14 calculates the measured distance based upon the histogram subsequently input from the FPGA 20 (an eighth measured distance D8 in the example presented in FIG. 5), the control circuit 14 controls the built-in display unit 15 so as to display the measured distance D8 (190 yd) corresponding to measured distance data d8. As a result, the user is able to view the measured distance (190 yd), indicated by the most recent measurement results, in the same visual field where the image of the pin flag PF is present, as shown in the example of the eighth display presented in FIG. 6H. At this time, the control circuit 14 stores the eighth measured distance data d8 into the specific memory mentioned earlier and subsequently repeatedly executes the processing described above.

While an explanation is given above by assuming that the user has selected the short distance priority mode, the control circuit 14 executes similar processing when the long distance priority mode is set. It is to be noted, however, that the control circuit 14 prohibits the measurement result display update when the following condition (2) is satisfied and leaves the same measurement results on display over the 0.8-sec period.

$$A-B \geq b \quad (2)$$

A, B and b in the expression presented above respectively represent the previous measured distance, the current measured distance and a reference distance.

It is to be noted that while an explanation is given above by assuming that the distance to the target object can be calculated, the control circuit 14 will not be able to calculate the measured distance if the measurement target object is set against, for instance, the sky, and the measurement light is not reflected off the target object, or if the measurement target object is positioned too far away, beyond the maximum measurement-enabled range. In such a case, the control circuit 14 controls the built-in display unit 15 so as to indicate that the distance measurement cannot be executed, e.g., "---", instead of displaying the measured distance.

Figure 7:
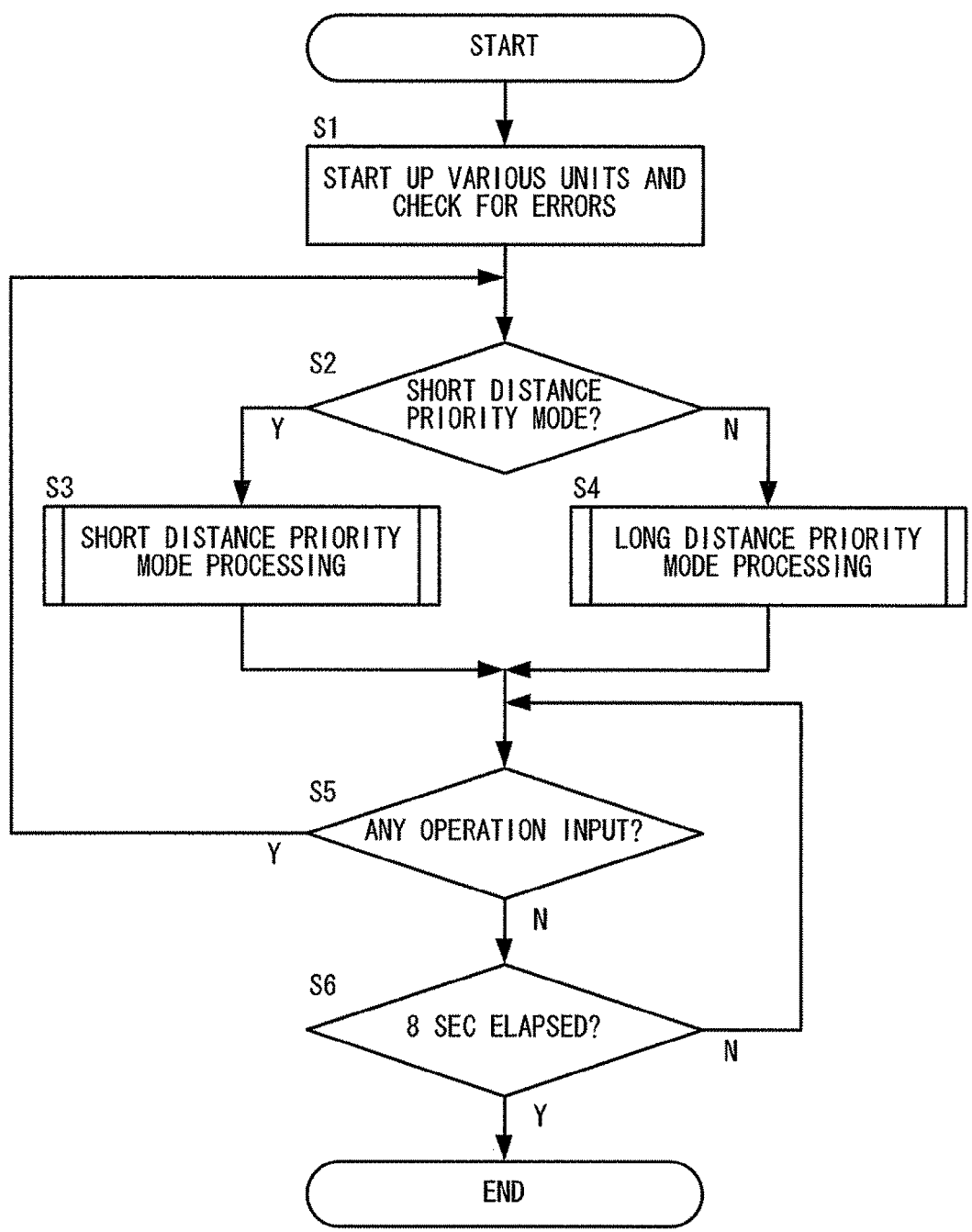
FIG. 7 presents a flowchart of the operation executed in the range-finding device in the embodiment
Figure 8:
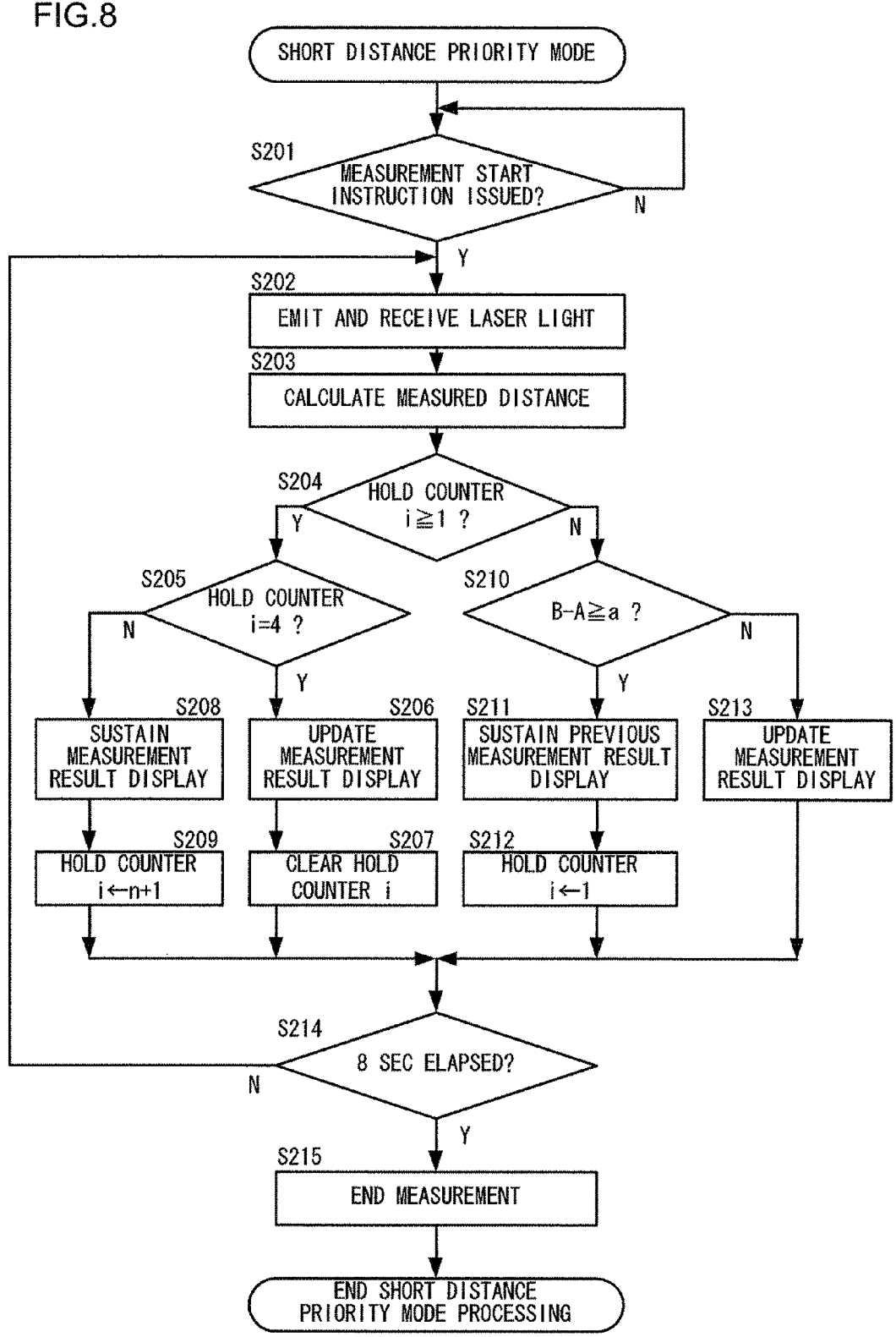
FIG. 8 presents a flowchart of the operation executed in the range-finding device in the embodiment.
Figure 9:
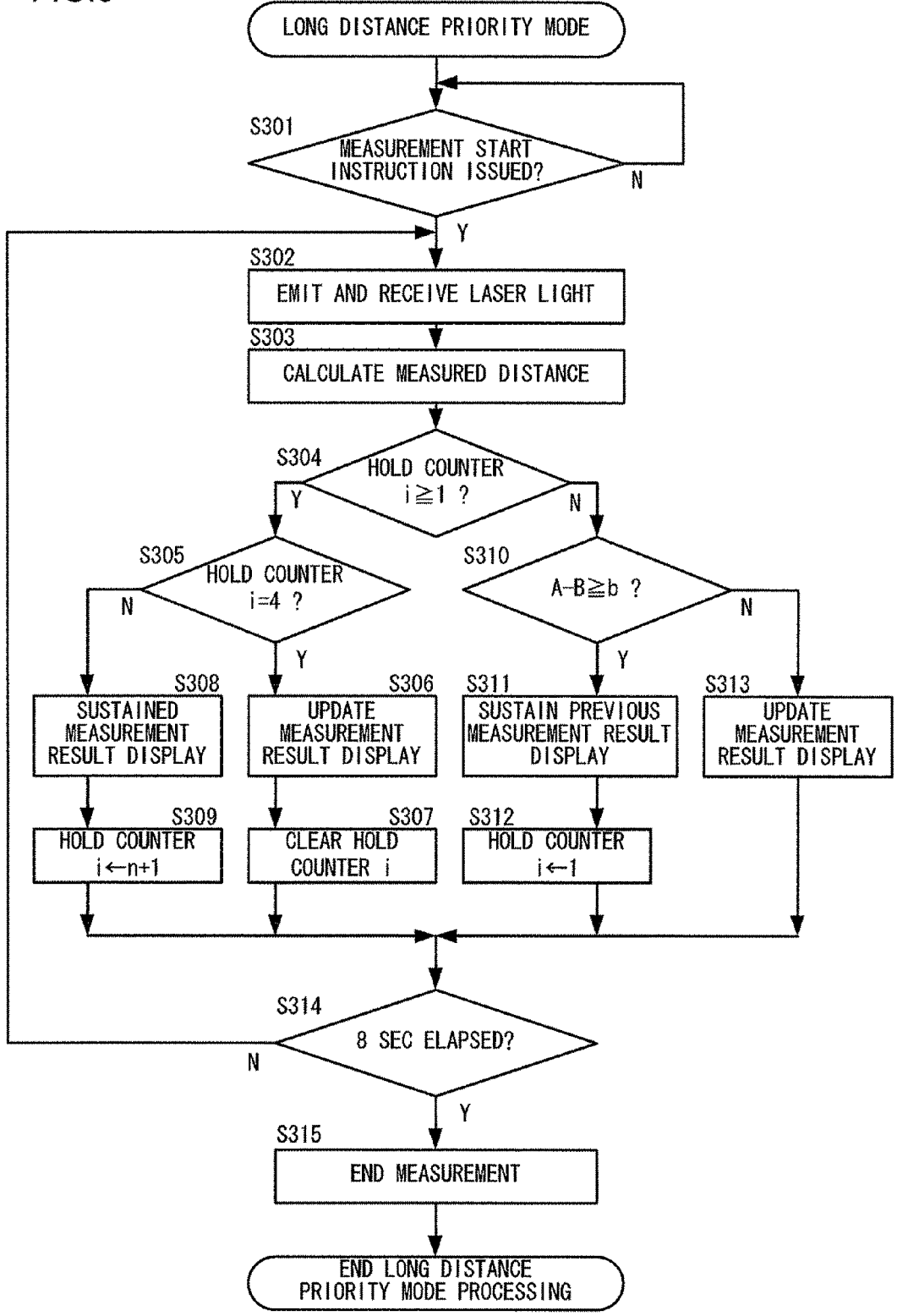
FIG. 9 presents a flowchart of the operation executed in the range-finding device in the embodiment.

In reference to the flowcharts presented in FIGS. 7~9, the operation executed at the range-finding device 1 is described. The processing in FIGS. 7~9 is executed by the control circuit 14 based upon a program. The program, stored in a memory (not shown) is started up as the power button 6 is operated to shift from the power OFF state to the power ON state.

In step S1, the various units constituting the range-finding device 1 are started up and undergo error checks before the operation proceeds to step S2. In step S2, a decision is made as to whether or not the short distance priority mode is currently set. If the short distance priority mode has been selected, an affirmative decision is made in step S2 and the operation proceeds to step S3. In step S3, various phases of the processing in the short distance priority mode are executed and then the operation proceeds to step S5. It is to be noted that the processing executed in step S3 in the short distance priority mode is to be described in detail later, in reference to FIG. 8. If, on the other hand, the long distance priority mode has been selected, a negative decision is made in step S2 and the operation proceeds to step S4. In step S4, various phases of the processing in the long distance priority mode are executed and then the operation proceeds to step S5. It is to be noted that the processing executed in step S4 in the long distance priority mode is to be described in detail later, in reference to FIG. 9.

In step S5, a decision is made as to whether or not the user has performed any of various operations. If a signal originating from a mode switch 5a or the power switch 6a has been input, an affirmative decision is made in step S5 and the operation returns to step S2. If no signal from either the mode switch 5a or the power switch 6a has been input, a negative decision is made in step S5 and the operation proceeds to step S6. At this time, a timer (not shown) is started up to start counting the length of time during which no signal is input. In step S6, a decision is made as to whether or not 8 seconds have elapsed after starting the time count on the timer in step S5. If 8 seconds have elapsed, an affirmative decision is made in step S6 and the processing ends. If, on the other hand, 8 seconds have not elapsed, a negative decision is made in step S6 and the operation returns to step S5.

In reference to FIG. 8, the short distance priority mode processing executed in step S3 is described.

In step S201, a decision is made as to whether or not a measurement start instruction has been issued by the user. If a measurement start instruction signal has been input from the power switch 6a, an affirmative decision is made in step S201 and the operation proceeds to step S202. At this time, the timer (not shown) is started up for a time count. If no measurement start instruction signal has been input, a negative decision is made in step S201 and the decision-making processing described above is repeatedly executed.

In step S202, the laser light emitter 11 is caused to emit light via the drive circuit 12, before the operation proceeds to step S203. In step S203, the measured distance calculation described earlier is executed by using the measurement light received at the light-receiving sensor 16, and then the operation proceeds to step S204. In step S204, a decision is made as to whether or not the hold counter i indicates a value equal to or greater than 1. An affirmative decision is made in step S204 if the count value indicated at the hold counter i is equal to or greater than 1 and the operation proceeds to step S205. If the count value indicated at the hold counter i is 0, a negative decision is made in step S204 and the operation proceeds to step S210 to be detailed later.

In step S205, a decision is made as to whether or not the count value indicated at the hold counter i is 4. If the count value at the hold counter i is 4, an affirmative decision is made in step S205 and the operation proceeds to step S206. If, on the other hand, the count value at the hold counter i is not 4, a negative decision is made in step S205, and the measured distance calculated in step S203 is brought up on display at the built-in display unit 15 before the operation proceeds to step S207. In step S207, the count value at the hold counter i is cleared to 0 and then the operation proceeds to step S214.

If a negative decision is made in step S205, the operation proceeds to step S208 to sustain the current measured distance display at the built-in display unit 15 before proceeding to step S209. In step S209, the count value at the hold counter i is incremented by 1 before the operation proceeds to step S214.

If a negative decision is made in step S204, the operation proceeds to step S210 to make a decision as to whether or not the relationship between the measured distance calculated through the previous distance measurement and the measured distance calculated through the current distance measurement satisfies the condition (1). If the condition (1) is satisfied, i.e., if the measured distance calculated through the current distance measurement is greater than the measured distance indicated by the previous measurement results by 5 yd or more, an affirmative decision is made in step S210 and the operation proceeds to step S211. If the condition (1) is not satisfied, a negative decision is made in step S210 and the operation proceeds to step S213.

In step S211, the measured distance display currently up at the built-in display unit 15 is sustained and then the operation proceeds to step S212. In step S212, the count value at the hold counter i is set to 1 before the operation proceeds to step S214.

If a negative decision is made in step S210, the operation proceeds to step S213 to bring up the measured distance indicated by the current measurement results having been calculated in step S203 on display at the built-in display unit 15, before the operation proceeds to step S214. In step S214, a decision is made as to whether or not 8 seconds have elapsed after starting the time count on the timer in step S201. If 8 seconds have elapsed, an affirmative decision is made in step S214 and the operation proceeds to step S215. If 8 seconds have not elapsed, a negative decision is made in step S214 and the operation returns to step S202. In step S215, the measurement light emission at the laser light emitter 11 is terminated via the drive circuit 12 to end the short distance priority mode processing.

In reference to FIG. 9, the long distance priority mode processing executed in step S4 is described.

The processing executed in step S301 (decision-making with regard to whether or not a measurement start instruction has been issued) through step S309 (incrementing the count value at the hold counter i) is identical to that executed in step S201 (decision-making with regard to whether or not a measurement start instruction has been issued) through step S209 (incrementing the count value at the hold counter i) in FIG. 8. In step S310, a decision is made as to whether or not the difference between the previous measured distance and the current measured distance satisfies the condition (2). If the condition (2) is satisfied, an affirmative decision is made in step S310 and the operation proceeds to step S311. If the condition (2) is not satisfied, a negative decision is made in step S310 and the operation proceeds to step S313. The processing executed in step S311 (sustaining the previous measurement result display) through step S315 (ending the measurement) is identical to the processing executed in step S211 (sustaining the previous measurement result display) through step S215 (ending the measurement) in FIG. 8.

The following advantages are achieved through the embodiment described above.

(1) The control circuit 14, engaged in a continuous measurement operation, repeatedly calculates the distance to the measurement target object every 0.2 seconds and each time the distance is calculated, it updates the distance display at the built-in display unit 15. However, the control circuit 14 prohibits the update of the distance display at the built-in display unit 15 and sustains the display of the previously calculated distance at the built-in display unit 15 based upon the difference between the current distance calculated most recently and the previously calculated distance. As a result, once a desirable distance to the measurement target object is brought up on display at the built-in display unit 15 during the continuous measurement (scan) operation, the display remains unaltered in the event that the distance to an undesired measurement target object is calculated. Accordingly, the user is able to ascertain the distance to the desired measurement target object with ease and better user convenience is assured.

(2) The control circuit 14 prohibits the update on the distance display at the built-in display unit 15 by sustaining the display of the previously calculated distance at the built-in display unit 15 over a specific length of holding time lasting 0.8 seconds. This feature differentiates the present invention from the prior art, in which the distance display at the built-in display unit 15 is updated each time the measured distance is calculated. Since the user is no longer required to memorize the distance to the desired measurement target object, which has been on display only briefly (0.2 sec), better user convenience is assured.

(3) Once the holding time is up, the control circuit 14 brings up the newly calculated distance on display at the built-in display unit 15. Since the distance display update resumes after the holding time elapses, a situation in which the range-finding device 1 is erroneously thought to be malfunctioning or to have become frozen never occurs.

(4) The control circuit 14 makes a decision as to whether or not the calculated difference exceeds the threshold value a and if the difference is judged to exceed the threshold value a, the control circuit prohibits the distance display update at the built-in display unit 15 to sustain the display of the previously calculated distance at the built-in display unit 15. In other words, as long as the difference does not exceed the threshold value a, the distance display is updated. Thus, since the distance display update is not prohibited too frequently, to result in an undesired measured distance display being held on display at the display unit, the user is prevented from confusing the wrong distance with the correct measured distance.

(5) In the short distance priority mode, the control circuit 14 prohibits the distance display update at the built-in display unit 15 and sustains the display of the previously calculated distance at the built-in display unit 15 if the calculated difference satisfies the condition (1) as explained earlier. In the long distance priority mode, the control circuit 14 prohibits the distance display update at the built-in display unit 15 and sustains the display of the previously calculated distance at the built-in display unit 15 if the calculated difference satisfies the condition (2) as explained earlier. Namely, the criterion based upon which the display update is prohibited can be switched in correspondence to a specific distance measurement target object, e.g., a pin flag on a golf course with very few obstacles present between the range-finding device and the target or an animal in the woods with a number of obstacles present between the range-finding device and the target object. As a result, the measured distance display is sustained in an optimal manner in correspondence to the conditions of the specific measurement target object to assure better user convenience.

(6) The user is able to adjust the threshold values a and b and the length of the holding time by operating the mode button 5 in the menu screen. Thus, the criterion for prohibiting the display update or the length of time over which the measured distance display is sustained can be adjusted in correspondence to the conditions of the measurement target object, making it possible to sustain the measured distance display in a manner optimal for the specific operating conditions, thereby improving the user convenience.

(7) As shown in FIGS. 4 and 6, at least the reticle R indicating measurement position and the measured distance can be viewed by the user via the eyepiece unit 4 in the same visual field where the image of the measurement target is present. This helps the user to easily ascertain that the measured distance on display indicates the distance to the measurement target object and thus improves the user convenience.

The embodiment described above allows for the following variations.

(1) Instead of measuring the length of the holding time via the hold counter i, the length of time elapsing after the prohibition of the measured distance display update takes effect may be measured on a timer or the like.

(2) Instead of both the short distance priority mode and the long distance priority mode, only either the short distance priority mode or the long distance priority mode may be available at the range-finding device 1.

(3) Instead of designating the difference between the most recently calculated measured distance and the previously calculated measured distance as the change to be scrutinized based upon the specific criterion, the decision as to whether or not the specific condition is satisfied may be made based upon the ratio of the most recently calculated measured distance and the previously calculated measured distance or based upon whether or not one measured distance is greater than the other.

While the invention has been particularly shown and described with respect to a preferred embodiment thereof by referring to the attached drawings, the present invention is not limited to the example and it will be understood by those skilled in the art that various changes in form and detail may be made therein without departing from the spirit, scope and teaching of the invention.

What is claimed is:

1. A range-finding device, comprising:
a light emitting unit that continuously emits measurement light to be used for distance measurement toward a measurement target object;
a light-receiving unit that receives reflected light reflected by the measurement target object;
a first calculation unit that repeatedly calculates a distance to the measurement target object over predetermined time intervals by using the reflected light;
a display unit at which an update of the distance is displayed each time the distance is calculated by the first calculation unit;
a second calculation unit that calculates a distance change between a first distance and a second distance, the first distance being calculated most recently by the first calculation unit and the second distance having been calculated previously by the first calculation unit;
a decision-making unit that makes a decision as to whether or not the distance change calculated by the second calculation unit exceeds a threshold value; and
a display update control unit that prohibits the update to the first distance on display at the display unit when the distance change exceeds the threshold value and sustains the display of the second distance at the display unit for a duration of a predetermined holding time.

2. A range-finding device according to claim 1, wherein:
after the holding time elapses, the first calculation unit calculates a new distance, and the display update control unit displays the new distance at the display unit.

3. A range-finding device according to claim 1, wherein:
the second calculation unit calculates a difference, as the distance change, between the first distance and the second distance, and
the display update control unit prohibits the update to the first distance on display at the display unit based upon the difference.

4. A range-finding device according to claim 3, wherein:
the decision-making unit makes a decision as to whether or not the difference calculated by the second calculation unit exceeds the threshold value, and when the decision-making unit determines that the difference exceeds the threshold value, the display update control unit prohibits the update to the first distance on display at the display unit and sustains the second distance on display at the display unit.

5. A range-finding device according to claim 4, wherein:
the second calculation unit calculates the difference by subtracting the second distance from the first distance and also calculates the difference by subtracting the first distance from the second distance.

6. A range-finding device according to claim 5, further comprising:
a first operation member operated to select between a first mode and a second mode, wherein:
when the first mode is selected, the second calculation unit calculates a first difference by subtracting the second distance from the first distance, the decision-making unit makes a decision as to whether or not the first difference exceeds a first threshold value, and the display update control unit displays the second distance at the display unit when the first difference exceeds the first threshold value, and when the second mode is selected, the second calculation unit calculates a second difference by subtracting the first distance from the second distance, the decision-making unit makes a decision as to whether or not the second difference exceeds a second threshold value, and the display update control unit displays the second distance at the display unit when the second difference exceeds the second threshold value.

7. A range-finding device according to claim 6, further comprising:
a second operation member operated to adjust a setting for the first threshold value, the second threshold value or the holding time.

8. A range-finding device according to claim 1, further comprising:
a viewing optical system through which the measurement target object is viewed, wherein:
a display is brought up at the display unit so that at least an index indicating a measurement position and the distance having been calculated are viewed within a visual field containing the measurement target object.

* * * * *